United States Patent Office 3,828,031
Patented Aug. 6, 1974

---

3,828,031
ETHERS
Friedrich Karrer, Basel, Switzerland, assignor to Ciba-Geigy AG., Basel, Switzerland
No Drawing. Filed Oct. 18, 1971, Ser. No. 190,305
Claims priority, application Switzerland, Oct. 20, 1970, 15,436/70
Int. Cl. C07d 1/00
U.S. Cl. 260—240 H                           3 Claims

ABSTRACT OF THE DISCLOSURE

Compounds of the formula

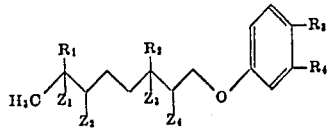

wherein $Z_1$ and $Z_2$ are together a carbon carbon bond or together an oxygen bridge or each hydrogen, $R_1$ and $R_2$ are each methyl, or ethyl, $Z_3$ and $Z_4$ together are a carbon carbon bond, $R_3$ is hydrogen, $C_2$-$C_5$ alkylcarbonyl, carbamoyl, $C_1$-$C_4$ monoalkyl-, $C_2$-$C_4$ alkenyl-, $C_2$-$C_4$ alkinyl- or arylcarbamoyl, $R_4$ is $C_2$-$C_5$ alkylcarbonyl, carbamoyl, $C_1$-$C_4$ monoalkyl-, $C_2$-$C_4$ alkenyl-, $C_2$-$C_4$ alkinyl- or arylcarbamoyl or $R_3$ is $C_2$-$C_5$ alkylcarbonyl, carbamoyl, $C_1$-$C_4$ monoalkyl-, $C_2$-$C_4$ alkenyl-, $C_2$-$C_4$ alkinyl- or arylcarbamoyl, $R_4$ is hydrogen, $C_2$-$C_5$ alkylcarbonyl, carbamoyl, $C_1$-$C_4$ monoalkyl-, $C_2$-$C_4$ alkenyl-, $C_2$-$C_4$ alkinyl- or arylcarbamoyl or $Z_3$ and $Z_4$ are each hydrogen and $R_3$ and $R_4$ are each hydrogen, $C_2$-$C_5$ alkylcarbonyl, carbamoyl, $C_1$-$C_4$ monoalkyl-, $C_2$-$C_4$ alkenyl-, $C_2$-$C_4$ alkinyl- or arylcarbamoyl.

Compounds according to the above formula wherein $Z_1$ and $Z_2$ are together a carbon carbon bond or an oxygen bridge, $R_1$ and $R_2$ are each methyl or ethyl, $Z_3$ and $Z_4$ are together a carbon carbon bridge, $R_3$ is acetyl, propionyl, butyryl, carbamoyl, monomethylcarbamoyl, monoethylcarbamoyl or monophenylcarbamoyl and $R_4$ is hydrogen, are useful for combating pests especially insects, representations of the order Acarina or nematodes.

This invention relates to new terpene aryl ethers, their manufacture and their use for influencing the development of invertebrate animals.

According to the present invention there are provided compounds of the general formula

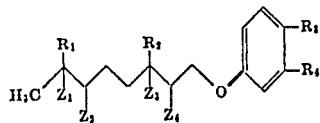

(I)

wherein $Z_1$ and $Z_2$ together are a carbon carbon bond or an oxygen bridge or are each hydrogen, $R_1$ and $R_2$ are each methyl or ethyl, $Z_3$ and $Z_4$ are together a carbon carbon bond, $R_3$ is hydrogen, $C_2$-$C_5$ alkylcarbonyl, carbamoyl, $C_1$-$C_4$ monoalkyl-, $C_2$-$C_4$ alkenyl-, $C_2$-$C_4$ alkinyl- or arylcarbamoyl; $R_4$ is $C_2$-$C_5$ alkylcarbonyl, carbamoyl, $C_1$-$C_4$ monoalkyl-, $C_2$-$C_4$ alkenyl-, $C_2$-$C_4$ alkinyl- or arylcarbamoyl or $R_3$ is $C_2$-$C_5$ alkylcarbonyl, carbamoyl, $C_1$-$C_4$ monoalkyl-, $C_2$-$C_4$ alkenyl-, $C_2$-$C_4$ alkinyl-, or arylcarbamoyl, $R_4$ is hydrogen, $C_2$-$C_5$ alkylcarbonyl, carbamoyl, $C_1$-$C_4$ monoalkyl-, $C_2$-$C_4$ alkenyl-, $C_2$-$C_4$ alkinyl- or arylcarbamoyl or $Z_3$ and $Z_4$ are each hydrogen and $R_3$ and $R_4$ are each hydrogen, $C_2$-$C_5$ alkylcarbonyl, carbamoyl, $C_1$-$C_4$ monoalkyl-, $C_2$-$C_4$ alkenyl-, $C_2$-$C_4$ alkinyl- or arylcarbamoyl.

The alkyl portion of alkylcarbonyl groups in respect of substituents $R_3$ and $R_4$ in formula I may be straight or branched-chain and may be unsubstituted or substituted.

As substituents for these groups there are for example halogen, such as fluorine, chlorine, bromine or iodine, $C_1$-$C_4$ alkoxy, hydroxy or $C_2$-$C_4$ alkoxycarbonyl.

Examples of suitable $C_2$-$C_5$ alkylcarbonyl groups for $R_3$ and $R_4$ are: ethyl, propyl, isopropyl, n-butyl, isobutyl, sec.- or tert.-butyl carbonyl groups.

Examples of carbamoyl groups for $R_3$ and $R_4$ are inter alia

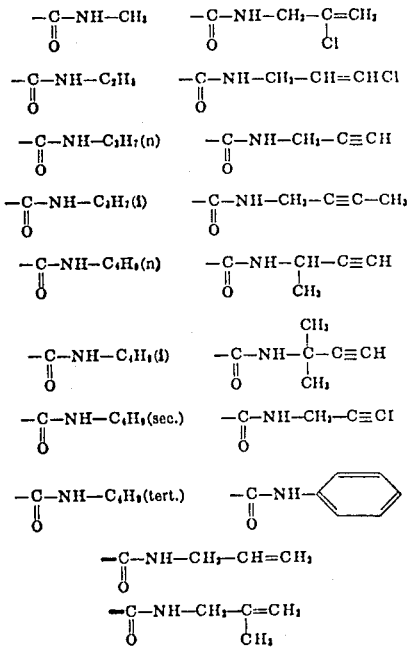

Of particular importance are compounds of formula I wherein $Z_1$ and $Z_2$ are together a carbon carbon bond or an oxygen bridge, $R_1$ and $R_2$ are each methyl or ethyl, $Z_3$ and $Z_4$ are a carbon carbon bond, $R_3$ is acetyl, propionyl, butyryl, carbamoyl, methyl-, ethyl- or phenyl carbamoyl and $R_4$ is hydrogen. Examples of suitable compounds are inter alia 1-(4-propionyl)-phenoxy-3,7-dimethyl-2,6-octadiene
1-(4-propionyl)-phenoxy-3,7-dimethyl-6,7-epoxy-2-octene
1-(4-acetyl)-phenoxy-3,7-dimethyl-2-nonadiene
1-(4-acetyl)-phenoxy-3,7-dimethyl-6,7-epoxy-2-nonene
1-(4-N-methylcarbamoyl)-phenoxy-3,7-dimethyl-2,6-octadiene
1-(4-N-methylcarbamoyl)-phenoxy-3,7-dimethyl-6,7-epoxy-2-octene
1-(4-butyryl)-phenoxy-3,7-dimethyl-2,6-octadiene
1-(4-butyryl)-phenoxy-3,7-dimethyl-6,7-epoxy-2-octene
1-(4-N-ethylcarbamoyl)-phenoxy-3,7-dimethyl-2,6-octadiene
1-(4-N-ethylcarbamoyl)-phenoxy-3,7-dimethyl-6,7-epoxy-2-octene
1-(4-carbamoyl)-phenoxy-3,7-dimethyl-6,7-epoxy-2-octene
1-(4-carbamoyl)-phenoxy-3,7-dimethyl-2,6-octadiene
1-(4-N-phenylcarbamoyl)-phenoxy-3,7-dimethyl-2,6-octadiene
1-(4-N-phenylcarbamoyl)-phenoxy-3,7-dimethyl-6,7-epoxy-2-octene.

The manufacture of compounds according to formula I takes place in fashion known per se by the following reactions, preferably with equimolecular quantities of the materials: if desired, however, an excess of one or more of the reactants taking part can be used:

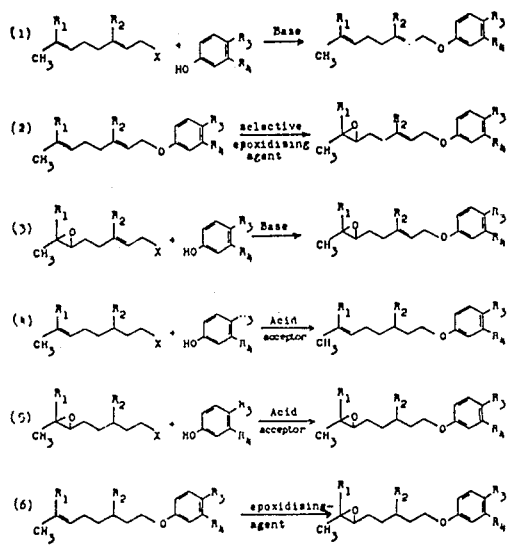

In the foregoing equations X stands for halogen, preferably chlorine or bromine.

Reactions (1) and (3), i.e. the reactions with mixtures of geometrical isomers of the reactive allylic halides with the desired phenol are carried out in a solvent such as 1,2-dimethoxyethane, tetrahydrofurane, dioxane, dimethylformamide, dimethylsulfoxide, sulfolane or a dialkylether, preferably, however in 1,2-dimethoxyethane, by slow addition of an equivalent of an acid acceptor such as an alkali or alkaline earth hydroxide or alkali or alkaline earth carbonate, or alkali alkoxide or alkali hydride with stirring at room temperature and optionally with subsequent warming. The isolation of the terpene aryl ether then takes place by known techniques. Amongst alkalis there should be understood here particularly potassium and sodium and among alkaline earth metals calcium.

Reactions (2) and (6), i.e. the transfer of the terpenoid arylethers into their 6,7 epoxy derivatives are preferably carried out with cooling in an inert solvent medium such as for example a chlorinated hydrocarbon, with an epoxidising agent, for example a peracid. With the use of one mol of peracid, then as a result of the steric factor predominantly the 6,7 epoxy derivative is formed. The 6,7 epoxy derivatives can also be obtained by the action of N-bromosuccinimide on the material to be epoxidised in a mixture of water with a solvent such as tetrahydrofurane, 1,2-dimethoxyethane, dioxane, or tert.butanol preferably with cooling in homogeneous or heterogeneous phase with subsequent treatment of the intermediate 6,7-bromohydrin which arises with an alkaline agent such as an alkali carbonate, alkali hydroxide or an alkali alkoxide. Among alkalis particularly sodium and potassium are to be understood.

By the term peracid, there is to be understood predominantly low peralkane acids with 1–6 carbon atoms, e.g. peracetic acid, as well as aromatic peracids such as perbenzoic acid, monoperphthalic acid, and particularly m-chloroperbenzoic acid. As basic reagents for transforming a bromohydrin into 6,7 epoxy derivatives alkali carbonates, alkali, hydroxides, and alkali alkoxides can be used.

The reaction according to equation (4) i.e. the reaction for example of a non-allylic aliphatic halide with a desired phenol takes place preferably in the presence of at least 1 mol of an alkali or alkaline earth carbonate, as well as with or without a catalytic quantity of an alkali iodide in a solvent medium such as e.g. acetone, methylethylketone, or cyclohexanone between room temperature and boiling temperature of the solvent used. The reaction can also take place with the aid of an alkali hydroxide in a solvent, e.g. dimethylformamide, dimethylsulfoxide, sulfolane or 1,2-dimethoxyethane between 0 and 100° C.

In the manufacture of compounds of formula I as a result of the alkyl halides used for the synthesis all possible geometrical isomers form. The compounds described are in the form of mixtures of the geometrical isomers which are obtained by the synthesis.

In the case when $R_3$ is alkyl- or arylcarbamoyl, the terpene aryl ether can be obtained either from the allylic halide and the phenol component according to equation (1) or, however, by the reaction of a 1-(4-low alkoxycarbonyl)-phenoxy-3,7-dialkyl-2,6-octa or nonadiene derivative or a 1-(4-low alkoxycarbonyl)-phenoxy-6,7-epoxy-3,7-dialkyl-2-octene or 2-nonene derivative with an alkyl- or aryl amino lithium derivative in a suitable inert solvent medium.

Furthermore, a 1-(4 - carbamoyl)-phenoxy-3,7-dialkyl-2,6-octadiene or 2-octene or 1-(4-carbamoyl)-phenoxy-3,7-dialkyl-2,6-nonadiene or 2-nonene compound can be reacted in dimethylsulfoxide in the presence of alkali hydroxide between room temperature and 80° C. with a corresponding alkyl, alkenyl or alkinyl halide to the desired 1-(4-N-alkyl, alkenyl or alkinyl)-phenoxy-3,7-dialkyl-2,6-octadiene or 2-octene or 1-(4-N-alkyl, alkenyl or alkinyl)-phenoxy-3,7-dialkyl-2,6-nonadiene or 2-nonene derivative.

The active substances of formula I are suitable for combating most varied animal and vegetable pests, particularly for combating insects, representatives of the order Acarina and plant parasitic nematodes. In contrast to most previously known insecticides, acaricides and nematocides, which rapidly kill, paralyse or drive away the animals working as contact or ingestion poisons, the active substances of formula I influence their development.

Thus in insects for example the moulting (in Hemimetabolites) or the transformation to the imago (in Holometabolites) and in representatives of the order Acarina particularly the development of the eggs is disturbed. The succession of generations is interrupted and the animals are thus indirectly killed off. For warm-blooded animals the compounds of formula I are practically non-toxic. As well as this, these compounds are easily decomposed and accumulation is accordingly not possible.

The new terpenyl arylethers can be used above all for combating the following plant, stored product and hygiene pests:

Against insects of the order and families:
　Orthoptera:
　　Acrididae (e.g. locusts, Schistocerca)
　　Gryllidae (e.g. Acheta, Gryllus)
　　Blattidae (e.g. *Blattella germanica, Periplaneta americana, Nauphoeta cinerea*)
　Isoptera: Kalotermitidae (e.g. Kalotermes)
Hemiptera:
　Hemiptera:
　　Miridae (e.g. Distantiella)
　　Piesmidae (e.g. Piesma)
　　Lygaeidae (e.g. Lygus)
　　Pyrrhocoridae (e.g. Dysdercus)
　　Pentatomidae (e.g. Eurydema)
　　Cimicidae (e.g. Cimex)
　　Reduviidae (e.g. Rhodnius)
　　Jassidae (e.g. Empoasca)
　　Eriosomatidae (e.g. Eriosoma)
　　Lecaniidae (e.g. Coccus)

Coleoptera:
- Carabidae (e.g. Carabus)
- Elateridae (e.g. Agriotes)
- Coccinellidae (e.g. Epilachna)
- Tenebrionidae (e.g. Tribolium, Tenebrio)
- Dermestidae (e.g. Dermestes, Anthrenus, Attagenus)
- Cucujidae (e.g. Oryzaephilus)
- Chrysomelidae (e.g. Leptinotarsa, Melasoma, Phyllotreta)
- Curculionidae (e.g. Sitona, Anthonomus)
- Scolytidae (e.g. Scolytus)
- Scarabaeidae (e.g. Melolontha)

Lepidoptera:
- Pyralidae (e.g. Diatraea)
- Phyticidae (e.g. Anagasta)
- Pyraustidae (e.g. Pyralis)
- Crambidae (e.g. Chilo)
- Tortricidae (e.g. Pandemis)
- Galleriidae (e.g. Galleria)
- Lyonetiidae (e.g. Lyonetia)
- Yponomeutidae (e.g. Hyponomeuta)
- Pieridae (e.g. Pieris)
- Plutallidae (e.g. Plutella)
- Lymantriidae (e.g. Lymantria)
- Noctuidae (e.g. Spodoptera)

Diptera:
- Culicidae (e.g. Aedes)
- Simuliidae (e.g. Simulium)
- Tipulidae (e.g. Chironomus), Against Acarina of the families:
- Ixodidae
- Argasidae
- Tetranychidae
- Dermanyssidae and against plant pathogenic nematodes e.g. Aphelenchoides, Ditylenechoides, Meloidogyne.

The compounds of formula I can be used alone or together with suitable carriers and or additive materials. Suitable carriers and additive materials can be solid or liquid and correspond to the customary materials used in formulation technique, e.g. natural or regenerated materials, solvents, dispersing agents, wetting agents, adhesives, thickeners, binders and/or fertilisers.

The manufacture of agents according to the invention takes place in known fashion by intimate mixing and/or milling of active substances of formula I with suitable carriers, optionally with the addition of dispersing agents or solvents inert to the active substance. The active substances can be present and be used in the following use forms:

Solid use forms: dusting agents, spreading agents, granulates, coated granules, impregnated granules and homogeneous granules.

Liquid use forms:
(a) Active substance concentrates dispersible in water: wettable powders, pastes, emulsions;
(b) Solutions.

For the manufacture of solid use forms (dusting agents, spreading agents) the active substances are mixed with solid carriers. As carriers there are, for example, kaolin, talcum, bolus, loess, chalk, limestone, limestone gravel, Attaclay, dolomite, diatomaceous earth, precipitated silica, alkaline earth metal silicates, sodium and potassium aluminium silicates (feldspars and mica), calcium and magnesium sulphates, magnesium oxide, ground plastics materials, fertilisers such as ammonium sulphate, ammonium phosphate, ammonium nitrate, urea, ground vegetable products such as crop flour, bark flour, wood flour, nutshell flour, cellulose powder, residues from plant extraction, active carbon etc., each being usable *per se* or in admixture with others.

Granulates can be made very easily by dissolving an active substance according to Formula I in an organic solvent medium, applying the solution so obtained to a granulated material such as attapulgite, $SiO_2$, lime, bentonite etc. and then evaporating the organic solvent medium again.

Polymeric granulates can also be made by mixing the active substance of Formula I with polymerisable compounds (urea/formaldehyde, dicyandiamide/formaldehyde, melamine/formaldehyde or others) and then carrying out a careful polymerisation which does not affect the active substance, and wherein during the gel-forming stage, granulation is carried out. It is more favourable to impregnate preformed porous polymer granules (urea/formaldehyde, polyacrylonitrile, polyester and others) with a given surface area and favourably predetermined adsorption/desorption ratio with the active substance, e.g. in the form of a solution (in a low-boiling solvent) and then to remove the solvent. Such polymer granulates can be used in the form of microgranulates of bulk density of preferably 300 to 600 g./litre with the aid of dusting apparatus. Dusting can be carried out over extended surfaces of useful plant cultures with the aid of aircraft.

Granulates can also be obtained by compacting the carrier material with the active material and additive materials and then breaking up the compact.

These mixtures can furthermore contain additives stabilising the active substance and/or non-ionic, anion active or cation active materials, which, for example, improve the adherence of the active substance to plants and plant parts (adhesives and glues) and or guarantee better penetration (wetting agents) or dispersability (dispersing agents).

The following substances may, for example, be used: Olein-lime mixtures, cellulose derivatives (methyl cellulose, carboxymethyl cellulose), hydroxyethyleneglycol ethers of mono- and dialkyl phenols with 5-15 ethylene oxide groups per molecule and 8-9 carbon atoms in the alkyl group, lignin sulphonic acids, their alkali and alkaline earth salts, polyethylene glycol ethers (Carbowaxes), fatty alcohol polyglycol ethers with 5-20 ethylene oxide groups per molecule and 8-18 carbon atoms in the fatty alcohol part, condensation products of ethylene oxide, propylene oxide, polyvinyl pyrrolidone, polyvinyl alcohols, condensation products of urea-formaldehyde as well as latex products.

Active substance concentrates dispersible in water, i.e. wettable powders, pastes and emulsion concentrates are materials which can be diluted with water to any desired concentration. They consist of active agent, carrier, optionally additives stabilising the active substance, surface active agents and anti-foaming agents, and optionally solvents.

The wettable powders and pastes are obtained by mixing and/or milling to homogeneity the active substance with dispersing agents and powder form carriers in suitable apparatus. As carriers, for example the materials mentioned above for solid use forms can be used. In some cases it is advantageous to use mixtures of various carriers. As dispersing agents there can be used, for example: condensation products of sulphonated naphthalene and sulphonated naphthalene derivatives with formaldehyde, condensation products of naphthalene or of naphthalene sulphonic acids with phenol and formaldehyde, as well as alkali, ammonium and alkaline earth metal salts of di-t-butyl-naphthalene sulphonic acids, fatty alcohol sulphates, such as salts of sulphonated hexadecanols, heptadecanols, octadecanols and salts of sulphated fatty alcohol glycol ethers, the sodium salt of oleyl methyl tauride, di-tertiary acetylene glycols, dialkyldilauryl ammonium chloride and fatty acid alkali and alkaline earth salts.

As anti-foaming agents, silicones may be used.

The active substances are so mixed with the above noted additives, milled, sieved and graded that for wettable powders the solid part has a particle size of 0.02 to 0.04 mm., in the pastes does not exceed 0.03 mm. For the manufacture of emulsion concentrates and pastes dispersing agents as set forth in the preceding paragraphs are used, organic solvents and water. As solvents, there are, for example, alcohols, benzene, xylenes, toluene, dimethyl sulphoxide and mineral oil fractions boiling in the range 120 to 350° C. The solvent medium must be practically odourless, non-phytotoxic and inert with respect to the active substances.

Furthermore, the agents according to the invention can be used in the form of solutions. For this, one or more active substances of Formula I is dissolved in suitable organic solvents, solvent mixes or water. As organic solvent there can be used aliphatic and aromatic hydrocarbons, their chlorinated derivatives, alkyl naphthalenes, mineral oils, alone or in admixture with one another.

The content of active substance in the agents noted above lies between 0.02 and 95%, but it is to be noted that in application from aircraft or by means of other suitable application devices, concentrations of up to 99.5% or even pure active substance could be used.

The active substances of Formula I can, for example, be formulated as follows:

Dusting agent: for the manufacture of an (a) 5% and (b) 2% dusting agent, the following materials were used.

(a)

| | Parts |
|---|---|
| Active substance | 5 |
| Talcum | 95 |

(b)

| | Parts |
|---|---|
| Active substance | 2 |
| Highly disperse silica | 1 |
| Talcum | 97 |

The active substances were mixed with the carrier materials are milled.

Granulate: for manufacturing a 5% granulate, the following materials were used:

| | Parts |
|---|---|
| Active substance | 5 |
| Epichlorohydrin | 0.25 |
| Cetyl polyglycol ether | 0.25 |
| Polyethylene glycol ("Carbowax") | 3.50 |
| Kaolin (particle size 0.3–0.8 mm.) | 91 |

The active substance was mixed with epichlorohydrin and dissolved in 6 parts acetone, whereafter the polyethylene glycol and cetyl polyglycol ether were added. The solution thus obtained was sprayed onto kaolin and the acetone then evaporated in vacuo.

Wettable powder: for manufacturing an (a) 40%, (b) and (c) 25% and (d) 10% wettable powder, the following components were used:

(a)

| | Parts |
|---|---|
| Active substance | 40 |
| Lignin sulphonic acid, sodium salt | 5 |
| Dibutyl naphthalene sulphonic acid, sodium salt | 1 |
| Silica | 54 |

(b)

| | Parts |
|---|---|
| Active substance | 25 |
| Calcium lignosulphonate | 4.5 |
| Champagne chalk-hydroxyethyl cellulose mixture (1:1) | 1.9 |
| Sodium dibutyl naphthalene sulphonate | 1.5 |
| Silica | 19.5 |
| Champagne chalk | 19.5 |
| Kaolin | 28.1 |

(c)

| | Parts |
|---|---|
| Active substance | 25 |
| Isooctylphenoxy-polyoxyethylene-ethanol | 2.5 |
| Champagne chalk-hydroxyethyl cellulose mix (1:1) | 1.7 |
| Sodium aluminium silicate | 8.3 |
| Kieselguhr | 16.5 |
| Kaolin | 46 |

(d)

| | Parts |
|---|---|
| Active substance | 10 |
| Mixture of sodium salts of fatty alcohol sulphates | 3 |
| Naphthalene sulphonic acid formaldehyde condensate | 5 |
| Kaolin | 82 |

The active substances were intimately mixed in suitable mixers with the additive materials and milled on suitable mills and rolls. Wettable powders were obtained which could be diluted with water to suspensions of any desired concentration.

Emulsifiable concentrate: for manufacturing an (a) 10% and (b) 25% emulsifiable concentrate, the following materials were used.

(a)

| | Parts |
|---|---|
| Active substance | 10 |
| Epoxidised vegetable oil | 3.4 |
| Combination emulsifier consisting of fatty alcohol polyglycol ethers and calcium alkyl aryl sulphonates | 13.4 |
| Dimethylformamide | 40 |
| Xylene | 43.2 |

(b)

| | Parts |
|---|---|
| Active substance acid ester | 25 |
| Epoxidised vegetable oil | 2.5 |
| Alkyl aryl sulphonate-fatty alcohol polyglycol ether mixture | 10 |
| Dimethylformamide | 5 |
| Xylene | 57.5 |

Emulsions of any desired concentration could be made from these concentrations by dilution with water. Spraying agent: for making an (a) 5% and (b) 2% spraying agent the follower components were used:

(a)

| | Parts |
|---|---|
| Active substance | 5 |
| Epichlorohydrin | 1 |
| Petrol (boiling range 160–190° C.) | 94 |

(b)

| | Parts |
|---|---|
| Active substance | 2 |
| 4,4'-dichlorodiphenyltrichlorethane | 3 |
| Kerosene | 95 |

These solutions were sprayed with pressure sprays. The solution (a) was advantageously used for combating aphids on fruit trees and other plants.

The following examples will serve to illustrate the invention:

EXAMPLE 1

1-(4-propionyl)-phenoxy-3,7-dimethyl-2,6-octadiene
(Active Substance No. 1)

To a solution of 30 g. 4-hydroxypropiophenone and 43.5 g. 2-bromo-3,7-dimethyl-2,6-octadiene in 320 ml. 1,2-dimethoxyethane there was added dropwise with stirring at room temperature within seven hours a solution of 12.8 g. about 85% potassium hydroxide in 200 ml. absolute ethanol. After a further 12 hours stirring at room temperature the mixture was warmed to 50° C. for 1 hour, cooled and filtered from the precipitated potassium bromide The filtrate was reduced in vacuo, the residue taken up in ether and thereafter washed three times each with 10% aqeuous caustic potash and water. After drying the ethereal solution over sodium sulphate the solvent was distilled off in vacuo and the remaining 1-(4-propionyl) - phenoxy - 3,7 - dimethyl - 2,6 - octadiene purified chromatographically on silica gel. (Elution agent: ether hexane 1:4), $n_D^{20}$: 1.5370.

EXAMPLE 2

1-(4-propionyl)-phenoxy-6,7-epoxy-3,7-dimethyl-2-octene (Active Substance No. 2)

To a solution of 17.2 g. 1-(4-propionyl)-phenoxy-3,7-dimethyl - 2,6 - octadiene in 180 ml. methylene chloride there was added dropwise at —2 to 0° C. within 3 hours a solution of 12.3 g. about 85% 3-chloroperbenzoic acid in 120 ml. methylene chloride ether (9:1) and the mixture was then stirred further for 3 hours at 0° C. For finishing the reaction mixture was diluted with ether, washed three times at 0° C. with ice-cold 10% caustic potash and then washed neutral with water. After drying the organic phase over sodium sulphate, the solvent was removed in vacuo and the 1-(4-propionyl)-phenoxy-6,7-epoxy-3,7-dimethyl-2-octene further purified by adsorption on silica gel. (Elution agent: ether hexane 1:2), $n_D^{20}$: 1.5326 (super.cooled melt), melting point 54–57° C. (isomeric mixture, from pentane).

EXAMPLE 3

1-(4-N-ethylcarbamoyl)-phenoxy-3,7-dimethyl-2,6-octadiene (Active Substance No. 3)

To a solution of 16.5 g. 4-hydroxybenzoic acid monoethylamide (see H. Schönenberger et al., Arzneimittelforschung, 14, 324–328 (1964)) and 22 g. 1-bromo-3,7-dimethyl-2,6-octadiene in 150 ml. of 1,2-dimethoxyethane there was added dropwise with stirring at room temperature within 6 hours a solution of 6.4 g. about 86% potassium hydroxide in 100 ml. absolute ethanol. The mixture was then stirred further for 16 hours at room temperature. For finishing, the mixture was filtered from the precipitated potassium bromide, the filtrate reduced in vacuum, the residue taken up in ether and thereafter washed three times with ice-cold 10% aqueous caustic potash and three times with water. After drying the ethereal solution over sodium sulphate the solvent was removed and the residue fully dried out in vacuo.

The so obtained 1-(4-N-ethylcarbamoyl)-phenoxy-3,7-dimethyl-2,6-octadiene was immediately transformed in the following fashion to the 1-(4-N-ethylcarbamoyl)-phenoxy-6,7-epoxy-3,7-dimethyl-2-octene.

EXAMPLE 4

1-(4-N-ethylcarbamoyl)-phenoxy-6,7-epoxy-3,7-dimethyl-2-octene (Active Substance No. 4)

To a solution of 15.5 g. 1-(4-N-ethylcarbamoyl)-phenoxy-3,7-dimethyl-2,6-octadiene in 160 ml. methylene chloride there was added dropwise and with stirring at 0° C. within 3 hours a solution of 10.7 g. 86% 3-chloroperbenzoic acid in 120 ml. methylene chloride ether (9:1). After the addition of the peracid the mixture was further stirred for 3 hours at 0° C. Then the reaction mixture was diluted with ether and washed three times with ice-cold 10% caustic potash and water, the organic phase then being dried over sodium sulphate, the solvent removed in vacuo and the 1-(4-N-ethylcarbamoyl)-phenoxy-6,7-epoxy - 3,7 - dimethyl-2-octene chromatographically purified on silica gel. (Elution agent: methylacetate-hexane 1:1), melting point 67–69° C.

Analogously to Examples 1–4 the following compounds were manufactured

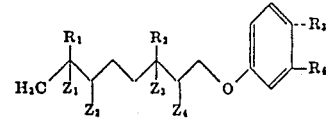

—C—C— carbon carbon bond
—O— oxygen bridge

| Active substance No. | $R_4$ | $R_3$ | $R_2$ | $R_1$ | $Z_1; Z_2$ | $Z_3-Z_4$ | Physical data |
|---|---|---|---|---|---|---|---|
| 5 | H | —CO—CH₃ | —CH₃ | —C₂H₅ | —C—C— | —C—C— | $n_D^{20}$, 1.5368 |
| 6 | H | —CO—CH₃ | —CH₃ | —C₂H₅ | —O— | —C—C— | $n_D^{20}$, 1.5321 |
| 7 | H | —CO—C₃H₇(n) | —CH₃ | —CH₃ | —C—C— | —C—C— | $n_D^{20}$, 1.5340 |
| 8 | H | —CO—C₃H₇(n) | —CH₃ | —CH₃ | —O— | —C—C— | $n_D^{20}$, 1.5287 |
| 9 | H | —CO—NH₂ | —CH₃ | —CH₃ | —C—C— | —C—C— | M.P., 105°–108° |
| 10 | H | —CO—NH₂ | —CH₃ | —CH₃ | —O— | —C—C— | M.P., 90°–92° |
| 11 | H | —CO—NHCH₃ | —CH₃ | —CH₃ | —O— | —C—C— | M.P., 97°–99° |
| 12 | H | —CO—NH—⟨phenyl⟩ | —CH₃ | —CH₃ | —C—C— | —C—C— | M.P., 116°–118° |
| 13 | H | —CO—NH—⟨phenyl⟩ | —CH₃ | —CH₃ | —O— | —C—C— | M.P., 113°–115° |

EXAMPLE 5

10 larvae of *Dysdercus fasciatus*, which were 8–10 days before the adult moult, were topically treated with acetonic active substance solutions. The test animals were then kept at 28° C. and 80–90% relative humidity. As food, the *Dysdercus fasciatus* larvae had groats from preswollen cotton seeds.

After about 10 days, i.e. as soon as the control animals had completed their adult moult, the test animals were evaluated. Apart from normal adults and dead larvae special forms were to be found such as extra larvae (larvae with an additional larval skin) and adultoids (adults with larval features). In the special types it is a question of non-viable stages of development which are not to be found in the normal cycle of development.

From the following table the number of animals is evident which were to be found in each of the various development stages at the various concentrations given:

A = normal adult
B = extra larvae
C = adultoids
D = dead larvae.

| | Amount of active substance in γ | Dysdercus fasciatus | | | |
|---|---|---|---|---|---|
| | | A | B | C | D |
| 1-(4-propionyl)-phenoxy-3,7-dimethyl-2,6-octadiene | 5 | | | | 10 |
| | 0.5 | 1 | | 9 | |
| 1-(4-propionyl)-phenoxy-6,7-epoxy-3,7-dimethyl-2-octene | 5 | | | 2 | 8 |
| | 0.5 | | 2 | 6 | 2 |
| 1-(4-N-methylcarbamoyl)-phenoxy-6,7-epoxy-3,7-dimethyl-2-octene | 5 | | 5 | | 5 |
| | 0.5 | | 9 | 1 | |
| 1-(4-acetyl)-phenoxy-3,7-dimethyl-2,6-nonadiene | 5 | | | 8 | 1 |
| 1-(4-acetyl)-phenoxy-6,7-epoxy-3,7-dimethyl-2-nonene | 5 | | 5 | | 4 |
| | 0.5 | | 4 | 5 | 1 |
| 1-(4-butyryl)-phenoxy-6,7-epoxy-3,7-dimethyl-2-octene | 5 | | 7 | | 3 |
| | 0.5 | | 9 | 1 | |
| 1-(4-N-ethylcarbamoyl)-phenoxy-3,7-dimethyl-2,6-octadiene | 5 | | 2 | | 8 |
| | 0.5 | | 1 | 8 | 1 |

EXAMPLE 6

In each test 10 fresh pupae of *Dermestes lardarius* were topically treated with solutions of active substance in acetone. The pupae were then kept at 28° and 80–90% relatively humidity.

After about 20 days, i.e. as soon as the control animals had left the pupal casing as Imagines, the test animals were evaluated; as well as normal adults and dead pupae adultoids (adults with larval characteristics) were found.

The adultoids were not viable stages of development and they are not to be found in the normal cycle of development.

A=normal adults
B=adultoids
D=dead pupae.

| | Amount of active substance in γ | Dermestes lardarius A | C | D |
|---|---|---|---|---|
| 1-(4-acetyl)-phenoxy-3,7-dimethyl-2,6-nonadiene | 5 | 1 | 9 | |
| | 0.5 | 2 | 6 | 2 |
| 1-(4-acetyl)-phenoxy-3,7-dimethyl-6,7-epoxy-2-nonene | 5 | | 10 | |
| | 0.5 | | 10 | |
| Control | | | 10 | |

EXAMPLE 7

In each case 10 fresh pupae of *Tenebrio molitor* were topically treated with active substance solutions in acetone. The pupae were then kept at 28° and 80–90% relative humidity. After about 10 days, i.e. as soon as the control animals had left the pupal skin as Imagines, the test animals were evaluated. As well as normal adults and dead pupae, adultoids were found (adults wtih larval features).

The adultoids were not viable stages of developments and they are not to be found in the normal cycle of development.

A=normal adults
B=adultoids
C=dead pupae.

| | Amount of active substance in γ | Tenebrio molitor A | C | D |
|---|---|---|---|---|
| 1-(4-propionyl)-phenoxy-3,7-dimethyl-2,6-octadiene | 5 | 1 | 8 | 1 |
| 1-(4-propionyl)-phenoxy-3,7-dimethyl-6,7-epoxy-2-octene | 5 | | 9 | 1 |
| | 0.5 | | 8 | 2 |
| 1-(4-acetyl)-phenoxy-3,7-dimethyl-2,6-nonadiene | 5 | 1 | 9 | |
| | 0.5 | | 9 | 1 |
| 1-(4-acetyl)-phenoxy-3,7-dimethyl-2-nonene | 5 | | 10 | |
| | 0.5 | 1 | 7 | 2 |
| 1-(4-butyryl)-phenoxy-6,7-epoxy-3,7-dimethyl-2,6-octadiene | 5 | 1 | 8 | 1 |
| Control | | | 10 | |

EXAMPLE 8

10 fresh pupae each of *Leptinotarsa decemlineata* were topically treated with solutions of active substance in acetone. The pupae were then kept at 28° and 80–90% relative humidity.

After about 10 days, i.e. as soon as the control animals had left the pupal casing as Imagines, the test animals were evaluated. As well as normal adults and dead pupae, adultoids were found (adults with larval features). In the case of adultoids they are not viable stages of development and are not to be found in the normal cycle of developments.

A=normal adults
B=adultoids.
D=dead pupae.

| | Amount of active substance in γ | Leptinotarsa decemlineata A | C | D |
|---|---|---|---|---|
| 1-(4-propionyl)-phenoxy-3,7-dimethyl-6,7-epoxy-2-octene | 5 | | 9 | 1 |
| 1-(4-acetyl)-phenoxy-3,7-dimethyl-2-nonadiene | 5 | | 9 | |
| | 0.5 | 1 | 7 | |
| 1-(4-acetyl)-phenoxy-3,7-dimethyl-6,7-epoxy-2-nonene | 5 | | 9 | 1 |
| | 0.5 | | 7 | 3 |
| Control | | | 10 | |

What is claimed is:

1. A compound of the formula

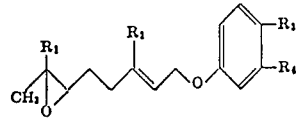

wherein each of $R_1$ and $R_2$ is methyl or ethyl; and one of $R_3$ and $R_4$ is hydrogen, $C_2$–$C_5$ alkylcarbonyl, carbamoyl, $C_1$–$C_4$ monoalkylcarbamoyl, $C_2$–$C_4$ alkenylcarbamoyl, $C_2$–$C_4$ alkynylcarbamoyl or arylcarbamoyl, and the other of $R_3$ and $R_4$ is $C_2$–$C_5$ alkylcarbonyl, carbamoyl, $C_1$–$C_4$ monoalkylcarbamoyl, $C_2$–$C_4$ alkenylcarbamoyl, $C_2$–$C_4$ alkynylcarbamoyl or arylcarbamoyl.

2. A compound according to claim 1 wherein $R_3$ is acetyl, propionyl, carbamoyl, monoethylcarbamoyl, monoethylcarbamoyl or monophenylcarbamoyl, and $R_4$ is hydrogen.

3. The compound according to claim 2 which has the formula

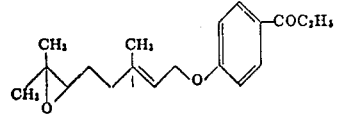

References Cited
FOREIGN PATENTS 1,932,062  10/1970  Germany _____ 260—240 H

OTHER REFERENCES

Brieger: J. Insect Physiol., vol. 17, pp. 2085–2093 (1971).

JOHN D. RANDOLPH, Primary Examiner

U.S. Cl. X.R.

260—348 H, 559 R, 592, 612 D; 424—278, 323, 331